United States Patent [19]

Binns

[11] Patent Number: 5,597,964
[45] Date of Patent: Jan. 28, 1997

[54] TORQUE MEASURING DEVICE FOR FREE RUNNING SELF-LOCKING NUT AND BOLT COMBINATION

[75] Inventor: Lloyd S. Binns, Harbor City, Calif.

[73] Assignee: Air Industries Corporation, Garden Grove, Calif.

[21] Appl. No.: 485,179

[22] Filed: Jun. 6, 1995

[51] Int. Cl.[6] ................................................ G01L 1/00
[52] U.S. Cl. ................................. 73/861.21; 73/761
[58] Field of Search ........................... 73/861.21, 861.22, 73/861.23, 761

[56] References Cited

U.S. PATENT DOCUMENTS

3,354,705  11/1967  Dyer, Jr. ........................................ 73/761
3,429,179  2/1969  Bowen et al. ................................... 73/761
3,440,869  4/1969  Hardiman ....................................... 73/761

*Primary Examiner*—Richard Chilcot
*Assistant Examiner*—Ronald L. Biegel
*Attorney, Agent, or Firm*—Hawes, Fischer & Dickinson

[57] ABSTRACT

A torque measuring device is described that measures forces occurring during the interconnection of a nut to a bolt. The device has particular application with bolts having a key aperture in the tail end thereof and with nuts having a swaged exterior surface. A matching swage socket is used to limit the torque applied to the nut as material from the nut is swaged into fluted surfaces of the bolt. The torque measuring device is responsive to the torque applied to the nut, the reaction torque generated by the bolt and the compressive force between the nut and the bolt. The torques and the compressive force can be simultaneously measured and displayed so that an active force profile can be provided.

13 Claims, 8 Drawing Sheets

TORQUE MEASURING DEVICE FOR FREE RUNNING SELF-LOCKING NUT AND BOLT COMBINATION

FIELD OF THE INVENTION

The present invention relates to a device for testing physical characteristics of a pair of complementary fasteners that have been connected together. More specifically, the present invention relates to a torque measuring device for testing the characteristics of a free running, self-locking nut and bolt combination, such as, for example, the type shown and disclosed in U.S. Pat. No. 5,145,300.

BACKGROUND OF THE INVENTION

It is important to know and be able to regulate the torque to be applied when installing a combination nut and bolt in order to connect two or more structural elements. Too little clamping force, usually applied in the form of a torque, can leave the connection loose so that it may succumb to an early fatigue failure. Too much clamping force can result in damage to the elements being joined. Even if the elements being joined can physically withstand over-tightening, such over-tightening may cause damage to one of the fasteners resulting in stripped threads, and the like.

One means to regulate torque, and therefore clamping force, has been to use a torque wrench. This tool is ideal in situations where the fasteners being torqued are few in number or where the operator could take the time to precisely tighten each fastener. However, in aerospace applications, tens and hundreds of thousands of fasteners must be installed in a relatively short time. Therefore, the ability to measure the torque of each bolt and nut combination during installation is simply not a viable option.

Torque limiters have been incorporated into pneumatic drivers to save time and increase efficiency. However, such torque limiters have resulted in both higher cost and questionable reliability. To reduce cost and improve reliability, nut and bolt sets, such as that described in U.S. Pat. No. 5,145,300 issued to John Wallace on Sep. 8, 1992 and known commercially as Ellipto-Lok, have self-locking features designed integrally therewithin.

However, aerospace fasteners must not only be cost effective, they must also be securely locked to prevent loosening under severe vibratory conditions. An inadequately locked fastener is of major concern, because loose fasteners have been known to be ingested into jet engines and cause severe damage thereto. The self-locking feature of the Ellipto-Lok fastener is therefore advantageous, but its reliability depends on the dimensional integrity of its driving socket or wrench which is known to be susceptible to degradation through wear. That is, the socket or wrench used to install the nut and bolt set may become worn with use, changing its clearances and tolerances. In some extreme cases, the socket may be so worn that it begins to act unpredictably on the nuts to produce unacceptably low installation torque and, consequently, create preload with loss of locking integrity.

Accordingly, it would be desirable to have available a torque measuring device that is adapted to provide a reliable means for measuring the changing output torque generated by an installation tool over time so that the life of the tool can be carefully monitored to insure that proper torquing forces will be applied during the installation of nut and bolt sets.

SUMMARY OF THE INVENTION

The present invention is a torque measuring device that functions as a test stand or test device and facilitates the rapid and certain measurement of the forces that are likely to be experienced by a nut and bolt fastener set. The torque measuring device has particular application for bolts having a key aperture in the tail end thereof and which are adapted to be fastened to a companion nut from one side of the structural elements to be joined together.

The invention is especially useful for testing swaged nuts, where a swage surface and shape is provided on the nut, and where a matching tool socket is used to apply a force-limiting clamping load on the joint between the nut and the socket followed by a lesser compressive force to lock the nut to the bolt. In essence, the swage action does not encourage further tightening of the nut onto the bolt, since the energy derived from further rotation of the tool socket is no longer tangential but radial to compress nut material into axial flutes that interrupt threads formed around the tail of the bolt.

Since nut and bolt fasteners are manufactured in large quantities, uniformity in manufacturing and quality control are essential to insuring a quality product that will respond predictably to predetermined tightening loads. Dimensional uniformity insures that the torque at which swaging occurs will be precise and accurate. The dimensional reliability of such nut and bolt fasteners advantageously furnishes a constant reference against which to measure the changing effectiveness of an installation tool socket which degrades with wear, since torque, compressive load and locking integrity typically diminish with increasing tool wear.

Further, the torque measuring device of this invention permits torques and compressive loads to be measured simultaneously. The use of the device of the present invention with swage limitation bolt and nut sets is particularly advantageous in that an active profile can be obtained to indicate measurements of three forces and related parameters, including the torque applied to the nut, the reaction torque of the bolt, and the axial clamping force between the nut and the bolt.

BRIEF DESCRIPTION OF THE DRAWINGS

The invention, its configuration, construction, and operation will be best further described in the following detailed description, taken in conjunction with the accompanying drawings in which:

FIG. 15 is an end view of the tapered plate set of FIG. 14a; and

DETAILED DESCRIPTION OF THE PREFERRED EMBODIMENT

Figure 1:
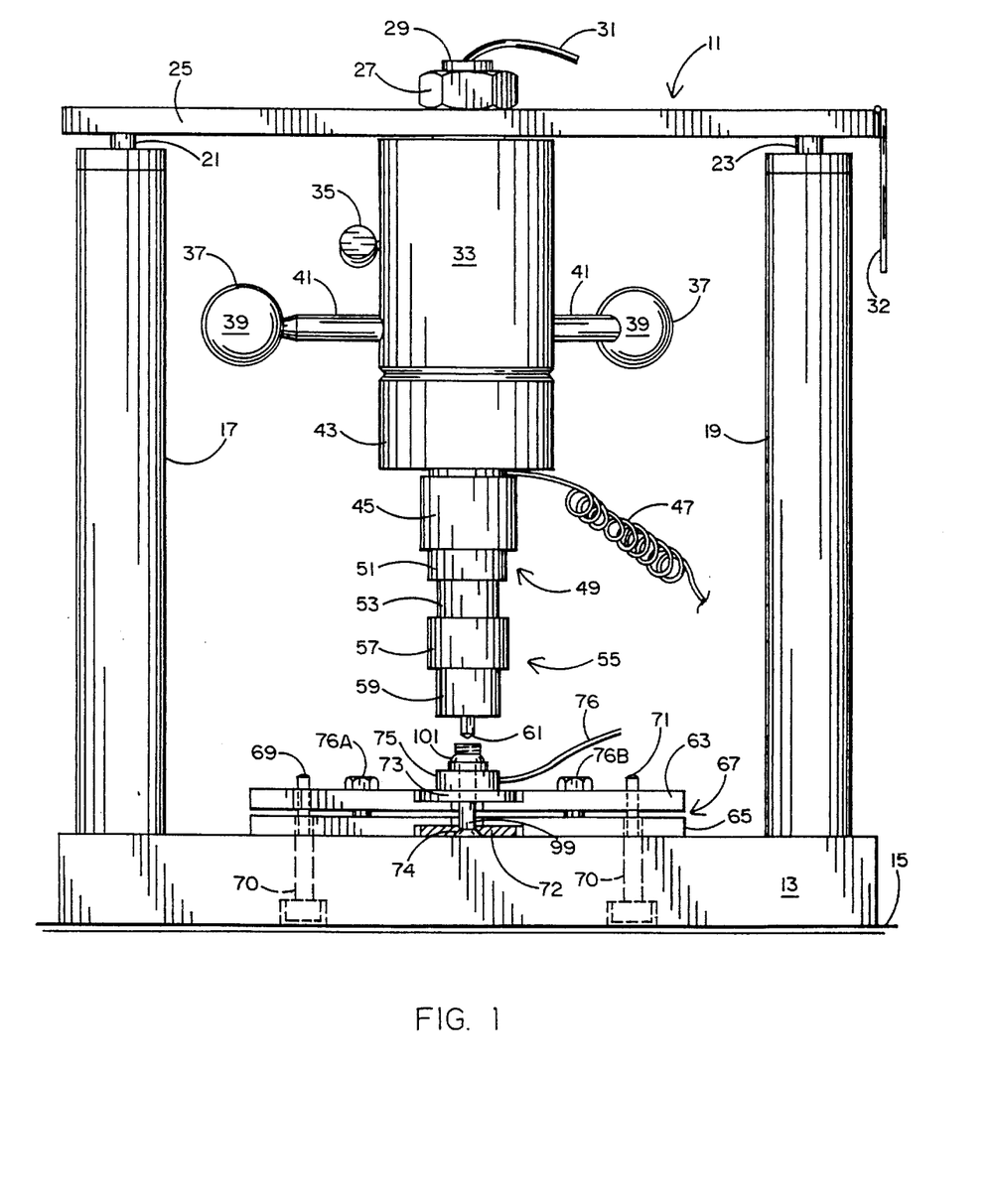
FIG. 1 is a plan view of the torque measuring device of the present invention prior to the engagement of a nut and bolt to be tested.

The description and operation of the invention will be best described while referring initially to FIG. 1 which shows the torque measuring device 11 which forms the present invention. The device 11 has a base plate 13 which may be bolted on any flat surface 15 necessary to give adequate support to device 11 and minimize vibration.

From the base 13, a first upright 17 and a second upright 19 are attached and depend for their support. The uprights 17 and 19 may be attached to the base 13 by any method, including a threaded attachment or press fit. The uprights 17 and 19 have a spring arrangement (best shown in FIGS. 4 and 4a) which engage rods 21 and 23 respectively. The rods 21 and 23 are preferably anchored into a top beam 25 by threaded engagement directly into the top beam 25. At the center of the top beam 25, a lock nut 27 engages a threaded tube 29. A first lead set 31 extends from the top of the threaded tube 29 from a bore (not shown) within threaded tube 29. The first lead set 31 may be a bundle of wires, shielded, or a coaxial lead, or a bundle of coaxial leads, as will be necessary for signal isolation and compatibility with the measurements which will be hereinafter described.

The threaded tube 29, with lock nut 27 attached, supports the central structures shown suspended above the base plate 13. The lock nut 27 is typically loosened with a wrench to enable the whole of the assembly suspended below the top beam 25 to be effortlessly moved about its axis so that a hex key 61 can be mated to a matching recess in a bolt when it is desirable to engage the bolt and nut to operate the device 11. A hinge 32 extends downwardly from the top beam 25 and is adapted to be pivoted into engagement with the top of the second upright 19 in order to anchor the top beam 25 against downward movement towards the base 13. From just below the bottom of the top beam 25 is disposed a hollow cylindrical extension 33 which forms the uppermost portion of a rotatable structure that is adapted to engage the nut of a nut and bolt combination in a manner that will be described in greater detail hereinafter.

Hollow cylindrical extension 33 carries a locking screw 35 for providing a temporary force lock which enables the hollow cylindrical extension 33 to be lifted up and locked in place against the top beam 25, as shown in FIG. 1. The hollow cylindrical extension 33 is not meant to be turned during engagement of the locking screw 35 which holds the extension 33 out of the way to facilitate changing of the setup. Of course, when the lock nut 27 is loosened, the whole assembly below the top beam 25 can easily turn, whether or not the locking screw 35 is engaged. The hollow cylindrical extension 33 rigidly supports and carries at least one, and preferably three handles 37, each handle comprising a grasping ball 39 and a radially extending support rod 41 which rigidly engages the hollow cylindrical extension 33.

Adjacent and below the hollow cylindrical extension 33 is a socket extension 43. Beneath the extension 43 is a cylindrically shaped portion 45 which contains a sensor (shown as a jacket) to respond to the torque of the tubular extension. This torque is essentially a driving torque which will be produced while a nut is turned against a bolt. A second lead set 47 is shown extending away from the socket extension 43. One end of second lead set 47 is connected to the sensor of jacket portion 45 while the other end of second lead set 47, like the first lead set 31, will be connected to one or more digital display instruments (not shown).

The flexible lead set 47, similar to that usually attached to a telephone hand set, is shown coiled to enable the lead set to be loosely wrapped about the structure hanging below the top beam 25. Accommodation could be made for an elaborate rotational electrical fitting to enable movement of a sleeve as the structure hanging below the top beam 25 is turned. However, since only a few turns are necessary to operate the device 11, the coiled lead set 47 is adequate. Second lead set 47 may also consist of a number of conductors, shielded or unshielded, or coaxial connectors for better shielding.

Beneath the cylindrically shaped sensor jacket 45 is a stepped lower section 49 of the socket extension 43. The lower section 49 has an upper concentrically larger diameter portion 51 and a lower concentrically smaller diameter portion 53. The lower section 49 supports a threadably removable socket adapter 55 which has an upper concentrically larger diameter portion 57 and a lower concentrically smaller diameter portion 59. From the bottom edge of the concentrically smaller diameter portion 59 extends the tip end of a hex key 61, which will interfit with a hexagonal recess formed in the tail of the bolt to be tested.

The structures underlying the top beam 25 forms a test setup or test stand. In its simplest form, the test setup includes an upper test plate 63 that is separated from a lower test plate 65 by a narrow space 67. The lower test plate 65 can be secured to the base plate 13 in any of a number of ways. In the setup shown in FIG. 1, a pair of bolts 69 and 71 have unthreaded extensions. Bolts 69 and 71 extend through apertures 70 in the base plate 13 to engage internal threaded surfaces in the lower test plate 65. The upper test plate 63 carries apertures to overfit and be guided by the unthreaded extensions of bolts 69 and 71. Lower plate 65 has a lower accommodation slot to receive a spacer 72. The spacer 72 is of appropriate thickness to resist deformation as a consequence of pressures applied during testing.

Upper plate 63 has a corresponding upper accommodation slot to receive a spacer 73 which functions like lower spacer 72. As shown in FIG. 1, the spacer 72 has a countersink to accommodate the flush head of a bolt 99. Accommodation slots (not shown) enable a nut and bolt combination to be inserted into the upper and lower plates 63 and 67 so that a load cell 75 may be inserted from the side.

Plates 63 and 65 in their spaced apart relationship are used to accept, along with the load cell 73, the compressive force applied by a nut and bolt set. The angular displacement of a set of three triangularly positioned elevator bolts eliminates the gap between plates 63 and 65 and displaces plate 63 towards plate 65. Only a pair of such elevator bolts 76A and 76B are seen, since the third bolt is located behind the load cell 75 and is not visible in FIG. 1. Elevator bolts 76A and 76B, as well as the unseen elevator bolt, will cause plate 63 to be displaced downwardly towards plate 65, eliminating the space 67 and enabling the bolt and nut set, which previously secured the load cell 75 against the plates 63 and 65, to be removed from the slots and moved laterally away from the plates 63 and 65.

Figure 2:
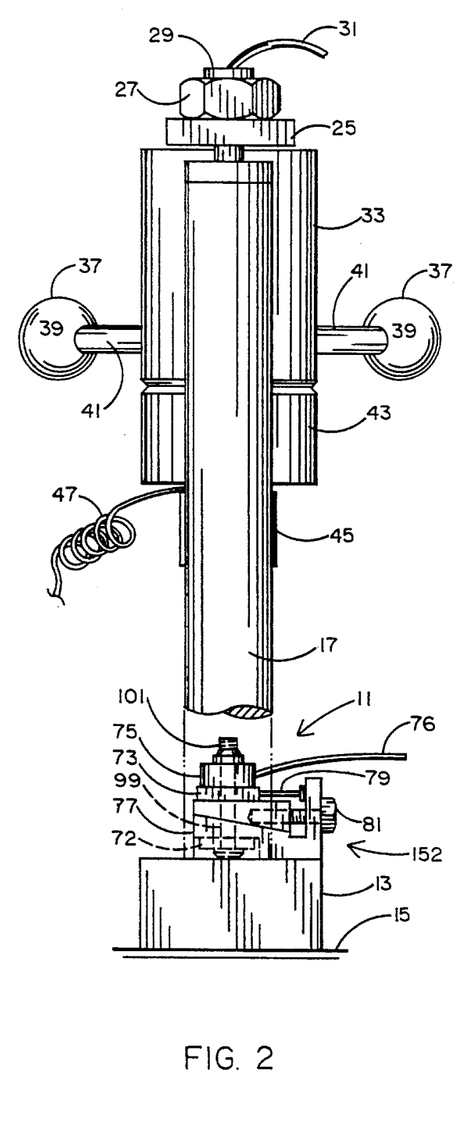
FIG. 2 is a side view of the torque measuring device shown in FIG. 1 illustrating a compression plate set which is used according to the preferred embodiment to hold the nut and bolt combination during testing and which is used to release the nut and bolt combination after testing.

The torque measuring device 11 of FIG. 1 is illustrated in side view in FIG. 2, but with the lower section of the first upright 17 removed for clarity. Note the abbreviated depth of the device 11 and, therefore, how little space in the horizontal direction is required to accommodate device 11.

A preferred and more complex arrangement of compression plates to be used in substitution of the simplified arrangement of upper and lower test plates 63 and 65 of FIG. 1 is shown in FIG. 2 and includes a base compression plate 77 and a wedge compression plate 79. A bolt 81 is secured through the base compression plate 77 and engages the wedge compression plate 79 to move wedge compression plate 79 towards the bolt 81 to free the bolt, nut, and load cell 75 once they have been compressed during testing. Since movement of the wedge compression plate 79 will cause the wedge compression plate 79 to lose elevation, the bolt (or bolts) 81 will typically extend through apertures which are slot shaped. The other structural features of the device 11 illustrated in FIG. 2 are identical to those shown in and described when referring to FIG. 1.

Figure 3:
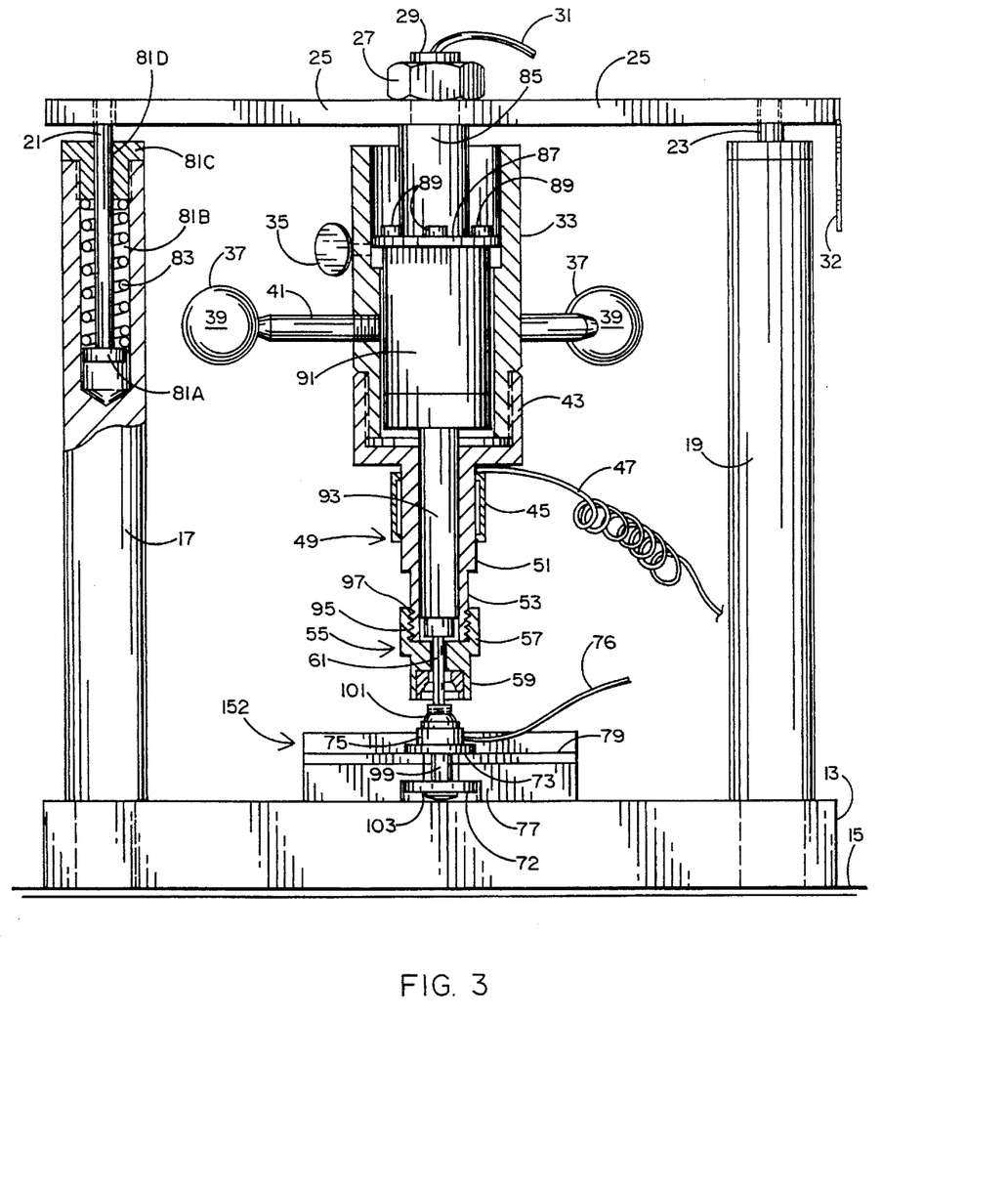
FIG. 3 is a partial cross-section of the torque measuring device partially engaging a nut and bolt combination to be tested.

Referring to FIG. 3, a partial sectional view of the torque measuring device 11 is shown. At the upper left of the device 11, a sectional cutaway of the first upright 17 shows the remainder of rod 21 as having a lower head 81A. The rod 21 is carried in a bore 81B within first upright 17. An upper plug 81C is threadably inserted into the bore 81B and carries its own bore 81D to slidably carry the length of the rod 21. A spring 83 is situated between the head 81A of the rod 21 and the upper plug 81C.

This arrangement urges the top beam 25 downwardly to bias the components carried by the top beam towards and into engagement with a nut and bolt set carried by test plates 77 and 79. The second upright 19 has an arrangement identical to that of first upright 17.

The threaded tube 29 extends through the top beam 25 to a central support 85 located therebelow. The central support 85 contains a flange 87 having a series of holes carrying bolts 89. The bolts 89 are affixed to an inner housing 91 which carries torque sensors (not shown) and which are connected to the lead set 31. The rotation of the handles 37 does not cause a rotation of the inner housing 91 and the hex key 61 when the inner housing 91 is secured to the top beam 25 via the central support 85 and when the central support 85 is fixed by the tightening of the nut 27.

However, the rotation of the handles 37 does rotate socket extension 43, cylindrically shaped portion 45, lower section 49, upper concentrically larger portion 51, lower concentrically smaller portion 53, and threadably removable socket adapter 55, including the larger diameter portion 57 and the lower concentrically smaller diameter portion 59. As can be seen, the threadably removable socket adapter 55 has threads 95 which engage a corresponding set of threads 97 carried by the lower, concentrically smaller portion 53.

FIG. 3 illustrates a setup where the hollow cylindrical extension 33 is moved downwardly so that the hex key 61 can engage a hexagonal recess in the tail of a bolt 99 to hold the bolt in place as a nut 101 is about to be engaged by the socket adapter 55. The engagement may be helped by loosening the lock nut 27. After engagement, the lock nut 27 is again tightened.

Further lowering of the hollow cylindrical extension 33, by releasing the locking key 35, will cause the socket adapter 55 to fully engage the nut 101. When the nut 101 is fully engaged, the handles 37 can be used to rotate the socket adapter 55 and the nut 101.

Also shown in FIG. 3 is the load cell 75. The load cell 75 measures the force being applied during the mating of nut 101 and bolt 99. Also shown is an enlarged head 103 of the bolt 99 which is coupled to base plate 77 and tapered plate 79 between the removable washer spacers 72 and 73. In this manner, the nut 101 may be installed on the bolt 99 while three parameters are being measured, namely the compression force through the load cell 75, torque from the cylindrically shaped sensor 45, and counter torque from the hex key 61 and its sensor in the inner housing 91.

First lead set 31 carries a signal developed in the sensor of housing 91 due to the reaction torque applied to hex key 61 fitted to a complementary recess in the tail of bolt 99 while nut 101 is tightened. The sensor for the first lead set 31 may be a model TS1140 commercially available from Futek company. Second lead set 47 carries a signal indicative of the torque applied to tighten the nut 101 by measuring the torque in the outer structures from the socket extension 43, lower section 49, upper concentrically larger portion 51, and lower concentrically smaller portion 53. The sensor for the second lead set 47 may be a model TS1138 commercially available from Futek company. Third lead set 76 carries a signal indicative of the direct compression pressure applied to the upper wedge shaped plate 79 and the base compression plate 77 via the washer spacers 72 and 73 and may be a model LS1137-3.5 by Futek company.

Figure 4:
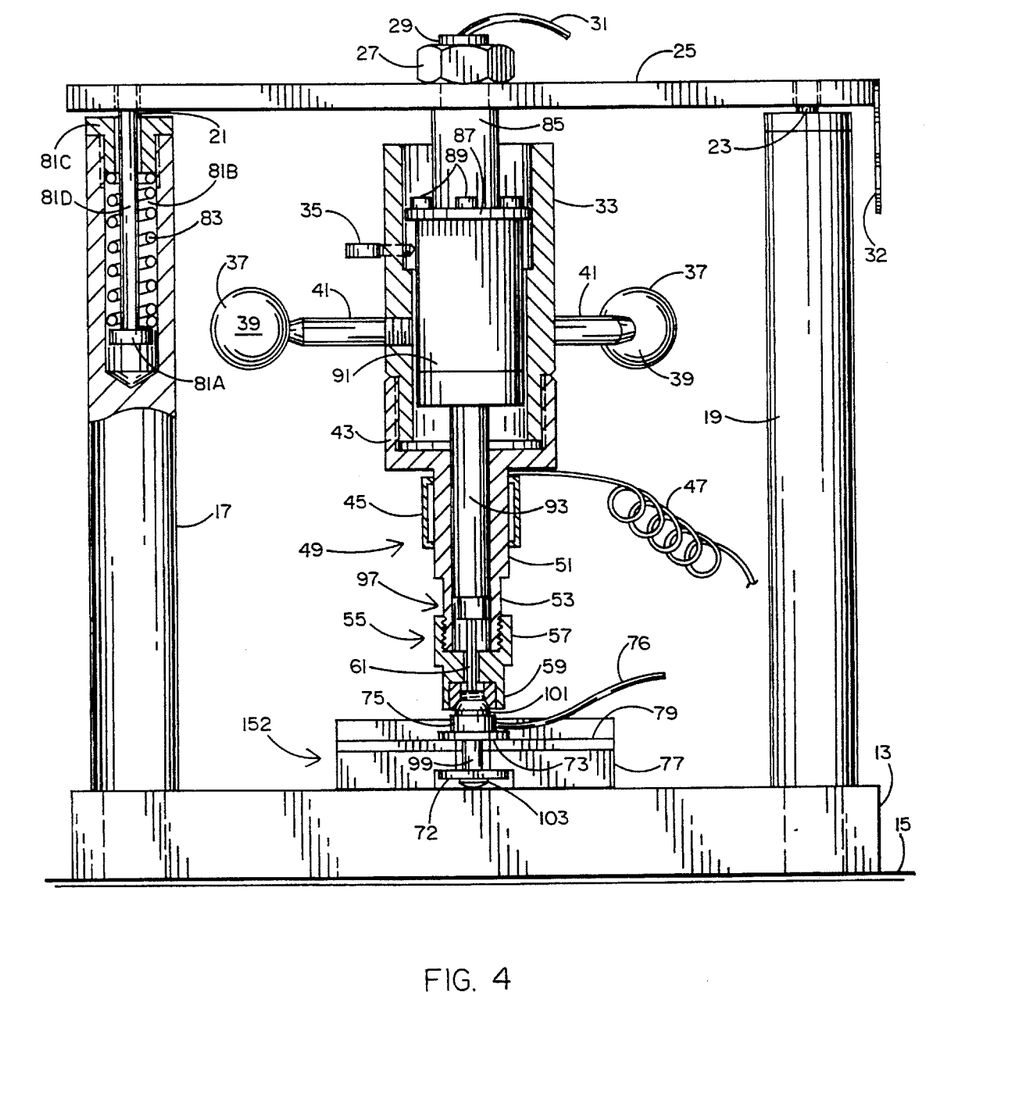
FIG. 4 is a partial cross-section of the torque measuring device as shown in FIG. 3, but fully engaging a nut and bolt combination to be tested.

Referring to FIG. 4, the hollow cylindrical extension 33 and the associated structures are shown in their maximum downward position causing the socket adapter 55 to cover and engage the nut 101. Once the nut 101 is engaged, the handles 37 can be rotated to correspondingly rotate adapter 55 and thereby tighten the nut 101. FIG. 3 illustrated the preliminary contact of hex key 61 with a hexagonal recess (not shown) in the bolt 99. This intermediate step is shown to indicate that the hex key 61 will contact the bolt 99 before the socket adapter 55 engages the nut 101.

The torque measuring device 11 is manufactured to take into account the fact that the outside of the nut 101 is aligned at an angular relationship between the hex key 61 and the socket adapter 55. To overcome this unfavorable relationship, means are provided which enables the hex key 61 to "float" above the bolt 101 until the relative relationships have more favorably aligned themselves.

Figure 4A:
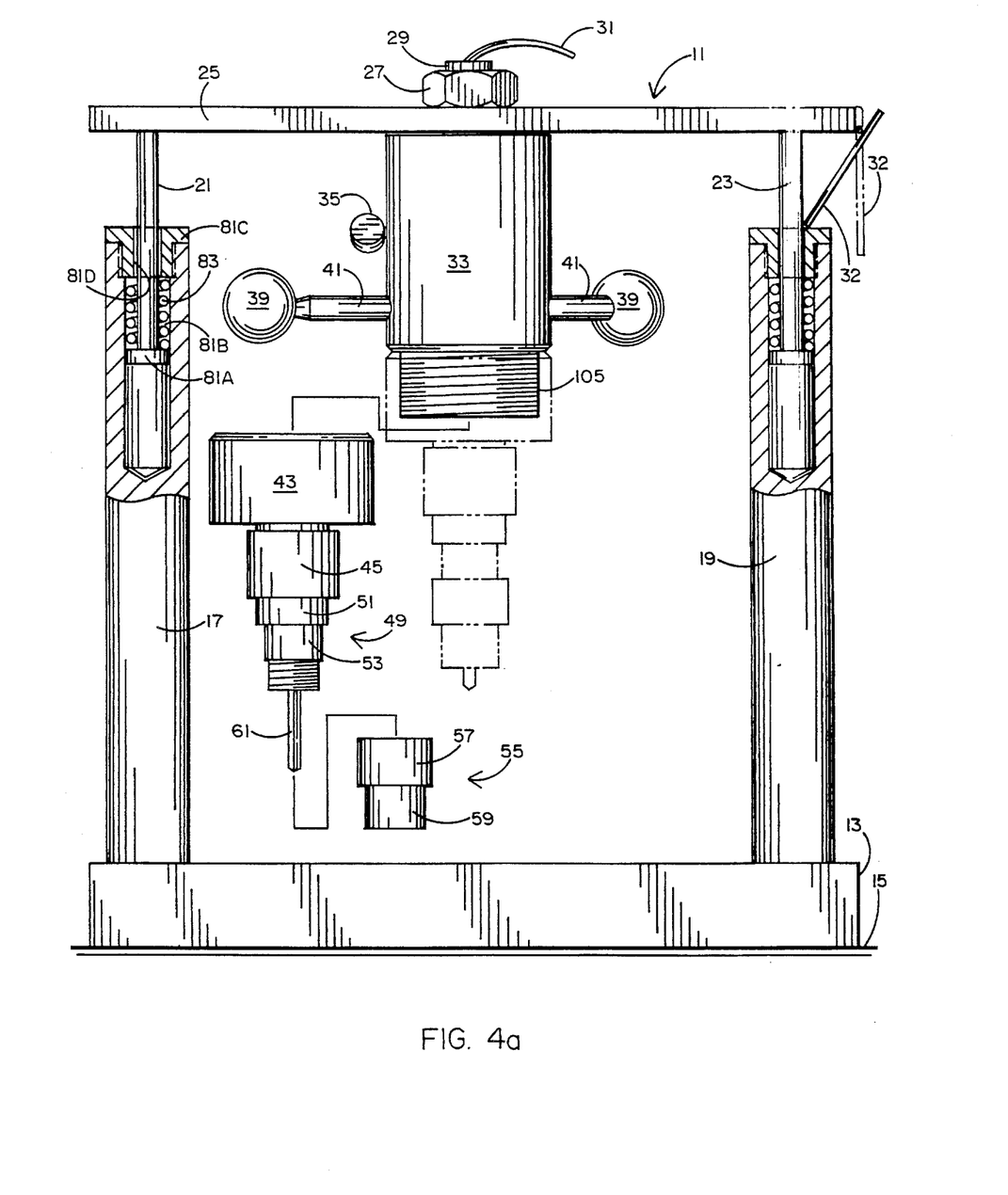
FIG. 4a is a partially exploded view of the torque measuring device.

In FIG. 4a, a partially exploded view is illustrated. Hinge 32 is shown folded inwardly, and top beam 25 is shown in the raised position. Note that lower head 81A of rod 21 is raised so as to compress spring 83. Moreover, hinge 32 maintains the top beam 25 in the aforementioned raised position. FIG. 4a is shown with the interiors of the socket extension 43 and lower structures in tact. The hollow cylindrical extension 33 is shown having threads 105 which engage the socket extension 43.

Figure 5:
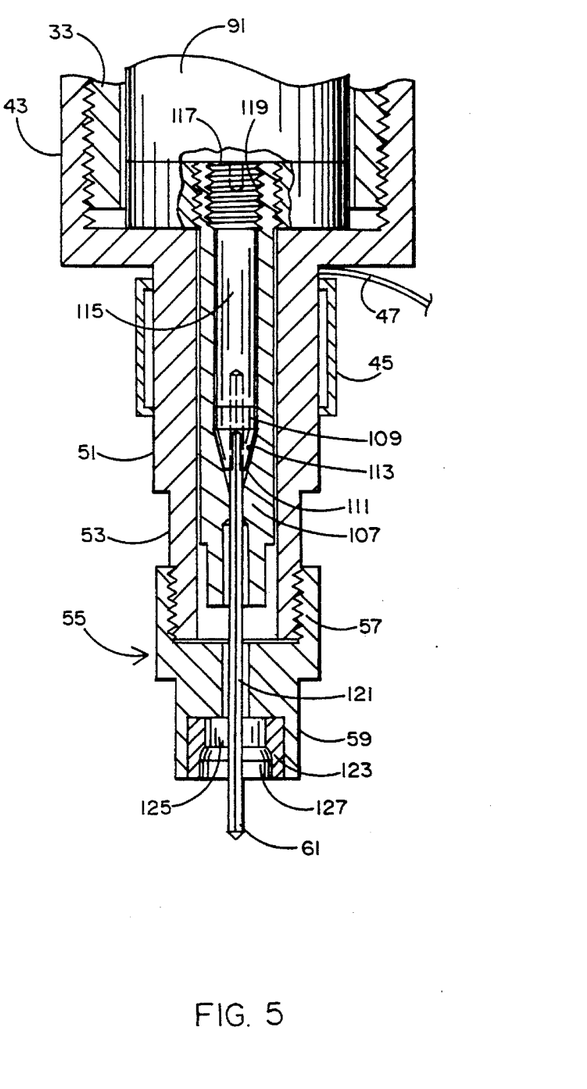
FIG. 5 is an enlarged cross-section illustrating the inner bolt torque sensor housing and its cooperation with a socket and socket extension.

Referring to FIG. 5, the hex key 61 is shown extending through the socket adapter 55. The hex key 61 then extends into an inner key carrier 107 which is supported by the inner housing 91. It should be understood that the inner housing 91 and inner carrier 107 along with the hex key 61 shown in FIG. 5 are generally not movable, either vertically or rotationally. On the other hand, the hollow cylindrical extension 33, socket extension 43, portion 45, upper concentrically larger portion 51, lower concentrically smaller portion 53, and threadably removable socket adapter 55 may be displaced vertically and rotated about a vertical axis.

Inside the inner carrier 107, which has an opening to match the shape of the key, a key collet 109 is provided to prevent axial translation of the hex key 61 with respect to the inner housing 91. The key collet 109 has a circular inner bore and a conical lower end meeting an abbreviated cylindrical surface. The conical end has a slot 111 formed therein which enables compression of the key collet 109 against a conical inner surface 113 of the inner carrier 107. A stud 115, located above the key collet 109, has an unthreaded lower shank and a threaded upper end, shown as threads 117, which engage internal threads 119 on the inner surface of the inner carrier 107.

It is important to have the non-rotatable components of the device 11 mutually and lockably co-dependent on each other. With the configuration thus disclosed, the hex key 61 can be longitudinally fixed with respect to the inner carrier 107 by urging the stud 115 downwardly against the key collet 109 to cause the fingers of the key collet 109 to grab the hex key 61. Since the hex key 61 is fixed, it is preferable to have the bolt 99 and nut 101 somewhat loose to facilitate the entry of the tip end of the hex key 61 into the hexagonal recess of the bolt 99, perhaps with some manual assistance.

Also shown in FIG. 5 are the sectional details of the socket adapter 55. A bore 121 extends through the center of the socket adapter 55 to accommodate the hex key 61. The size of bore 121 must be large enough so that the rotating socket adapter 55 will not affect the fixed hex key 61 which would transmit bolt reaction torque forces through the carrier 107 and on to the sensor located in the inner housing 91.

Figure 6:
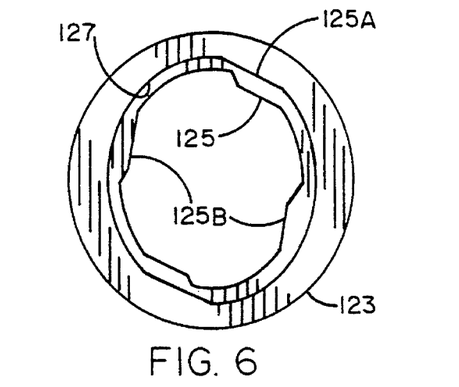
FIG. 6 is a bottom view of the socket shown in FIG. 5.

FIG. 5 further illustrates the presence of an annular insert 123 which has a stepped bore having surfaces 125 and 127. Surface 125 has a shape that is adapted to swage material from the nut 101 into fluted recesses interrupting the last few bolt threads. As shown in FIG. 6, the interior of the insert 123 is slightly oval shaped.

As is the case for all of the sensors used in torque measuring device 11, there must be sufficient micro-movement of the interrelated parts to adequately measure the forces developed during operation. Note that forces are developed between the key collet 109, the hex key 61, the stud 115 and the inside surface of carrier 107 and that these forces are isolated from one another in the non-rotatable portion of the device 11.

Referring to FIG. 6, a bottom view of the insert 123 shown in FIG. 5 is illustrated to more clearly show the surfaces 125 and 127. The insert 123 is the functioning portion of the torque measuring device 11 and will engage the nut 101.

Figures 3A, 7, 8:
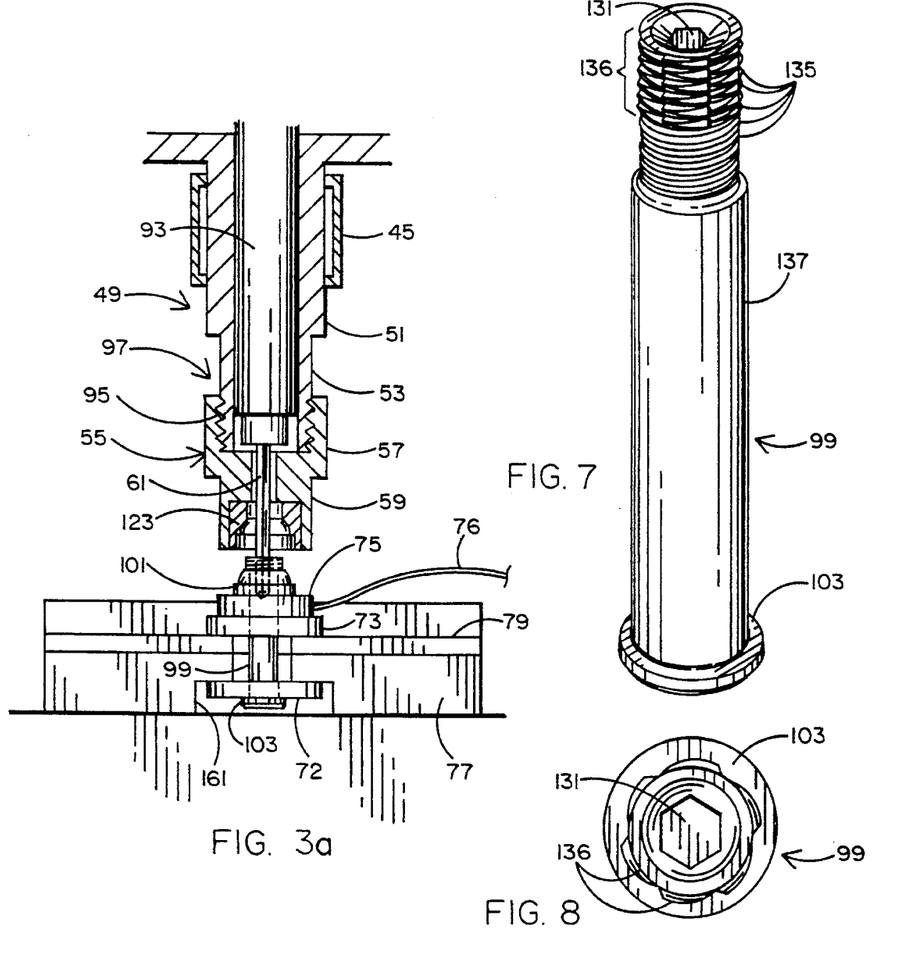
FIG. 3a is an enlarged detail of FIG. 3 showing the torque measuring device partially engaging the nut and bolt combination to be tested.
FIG. 7 is a perspective view of a bolt used to form the nut and bolt combination to be tested.
FIG. 8 is a top view of the bolt shown in FIG. 7.

Referring to FIG. 7, an enlarged view of the bolt 99 is shown as having a hexagonal recess 131 for accepting the hex key 61 previously described. Bolt 99 has a threaded structure 135 including a fluted portion 136. A smooth cylindrical portion 137 is located between the threaded structure 135 at one end of the bolt 99 and a relatively wide but thin head 103 is located at the opposite end.

Referring to FIG. 8, a top view of the bolt 99 of FIG. 7 more clearly shows the hexagonal recess 131 and the fluted portion 136. Note that the top of the bolt 99 is generally cylindrical except for the fluted portion 136.

Figure 9:
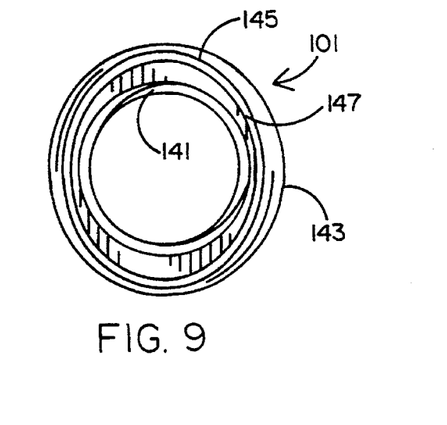
FIG. 9 is a top view of a nut which is to be combined with the bolt shown in FIGS. 7 and 8.

Referring to FIG. 9, a top view of the nut 101 is illustrated. Nut 101 includes internal threads 141 and three distinct outer portions. A lowermost and outermost portion 143 of nut 101 is round. A middle and intermediate portion 145 of nut 101 is oval. The uppermost and innermost portion 147 is also oval.

Figure 10:
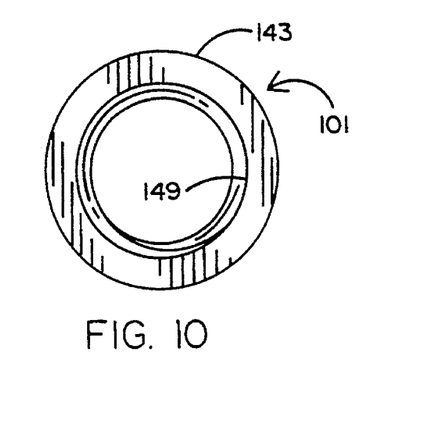
FIG. 10 is a bottom view of the nut of FIG. 9.
Figure 11:
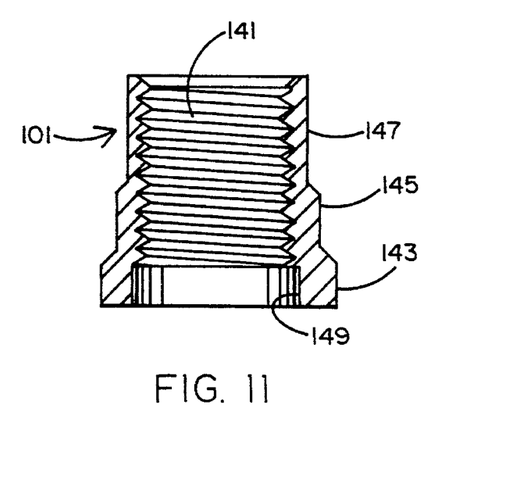
FIG. 11 is a side view, in cross-section, of the nut of FIGS. 9 and 10.
Figure 12:
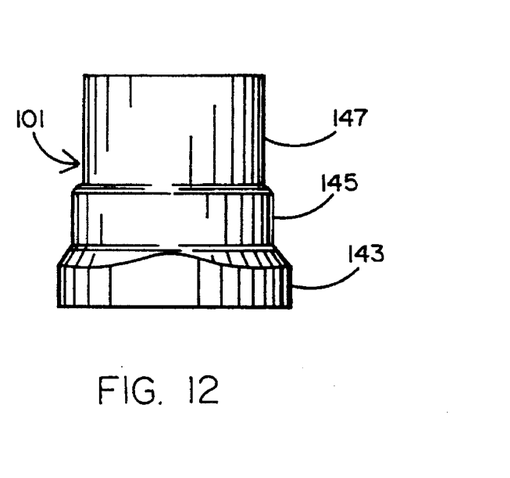
FIG. 12 is a side view of the nut of FIGS. 9 and 10 showing the exterior thereof.

Referring to FIG. 10, a bottom view of nut 101 is shown to illustrate the lowermost portion 143 thereof having a counterbore 149. FIG. 11 is a sectional view of the nut 101 and more fully illustrates the internal threads 141 thereof and the differences in axial proportions of the aforementioned three distinct outer portions 143, 145 and 147 of the nut 101. FIG. 12 illustrates an external view of the nut 101 which more fully shows the relationship of the oval middle portion 145 thereof to the adjacent round lowermost portion 143.

Figure 13:
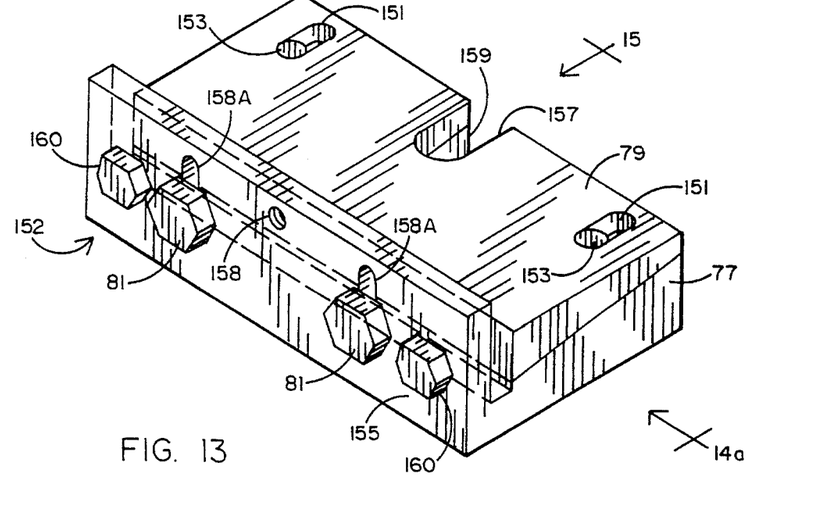
FIG. 13 is a perspective view of the compression plate set of FIG. 2.

Referring concurrently to FIGS. 13 and 13a, details of the compression plate set, designated 152, including the base compression plate 77 and the wedge compression plate 79, are now described. The wedge compression plate 79 includes a pair of slots 151 which receive a pair of pins 153 extending upwardly from their fixed relationship to the base compression plate 77. Actuator bolts 81 are adapted to urge wedge compression plate 79 to slide over base compression plate 77 unhindered because of the presence of slots 151.

Referring briefly once again to FIGS. 6 and 12, during installation of the nut 101, cammed regions of the two oval segments 145 and 147 of nut 101 provide means to respond to the torque transmitted by a pair of driving flats 125A within the insert 123 of tool socket adapter 55. The rotating nut 101 then exerts pressure on the pair of compression plates 77 and 79 and the preload force increases. On reaching the predetermined limit, resistance to torque causes driving flats 125A within the tool socket insert 123 (see FIG. 6) to redistribute, in a circumferential direction, material from the cammed regions of oval segments 145 and 147 of nut 101. The relative motion of the driving flats 125A to the now stationary nut 101 carries the driving flats around the major axes of nut segments 145 and 147 and into a neutral position. Subsequently, another pair of driving flats 125B of insert 123 swages the residue of cammed material in the smaller oval segment 147 of nut 101 to complete the installation. Residual material in the cammed region of the larger oval segment 145 provides torquing means if the nut were to be removed.

Returning now to FIG. 13, the compression plate set 152 is illustrated and described in the working position. If the bolts 81 are turned clockwise, the wedge compression plate 79 will be translated laterally and downwardly towards the front 155 of the compression plate set 152 in a manner that is facilitated by slots 151 and 158A.

Figure 14A:
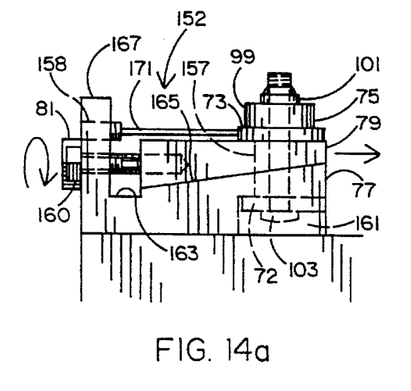
FIG. 14a is a side view of the compression plate set of FIG. 13 shown in set up position.
Figure 14B:
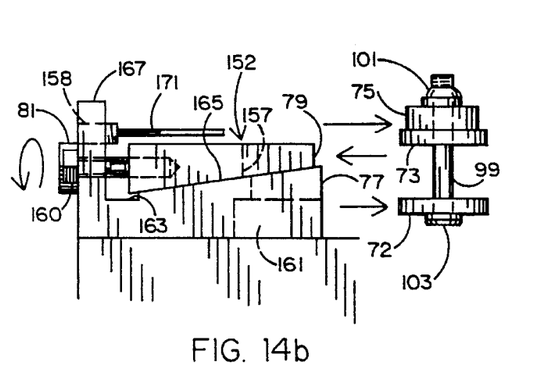
FIG. 14b is a side view of the compression plate set of FIG. 14, but in the release condition.
Figure 15:
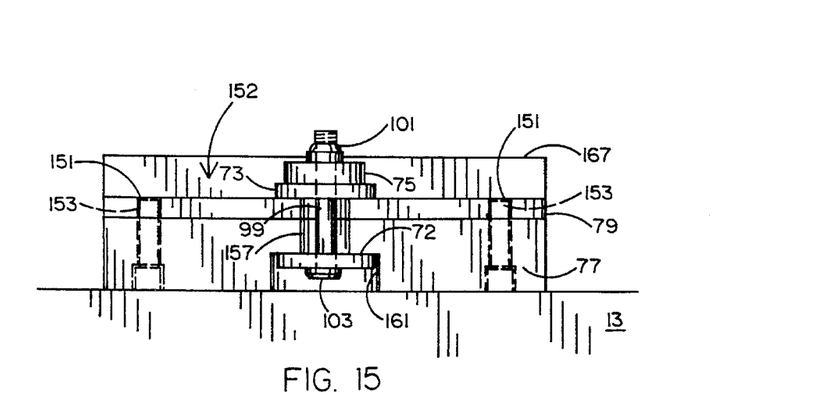

A threaded bore 158 extends through a vertically extending front wall 155 of the base compression plate 77 to receive a limiting stud 171 (shown in FIGS. 14a and 14b). The stud 171 registers against the washer spacer 73 to prevent the bolt and nut assembly from translating with the wedge plate 79, especially as the wedge compression plate 79 is brought forwardly and downwardly.

As is best shown in FIG. 13, a pair of safety holding bolts 160 are threaded through the vertical front wall 155 of the base compression plate 77 to engage the wedge compression plate 79 and hold plate 79 against being urged downwardly over the slope of compression plate 77. The holding bolts 160 insure that plate 77 will not slip during loading.

Referring now to FIG. 14a, the compression plate set 152 of FIG. 13 is shown after compression and testing have been completed and the safety holding bolts 160 have been removed from base compression plate 77. In this regard, only after removal of the bolts 160 can the compression plate 79 begin to be urged toward the vertical end portion 167 of the base compression plate 77.

FIG. 14a also illustrates a recess 161 formed in base compression plate 77 to accommodate washer spacer 72 and the head 103 of bolt 99. There is a slot 163 between a main sloped surface 165 of the base compression plate 77 and the top 167 of the front wall 155 thereof to provide space to accommodate the movement of the wedge compression plate 79. Note that the top 167 of vertical front wall 155 is higher than the top of the wedge compression plate 79.

Figure 16:
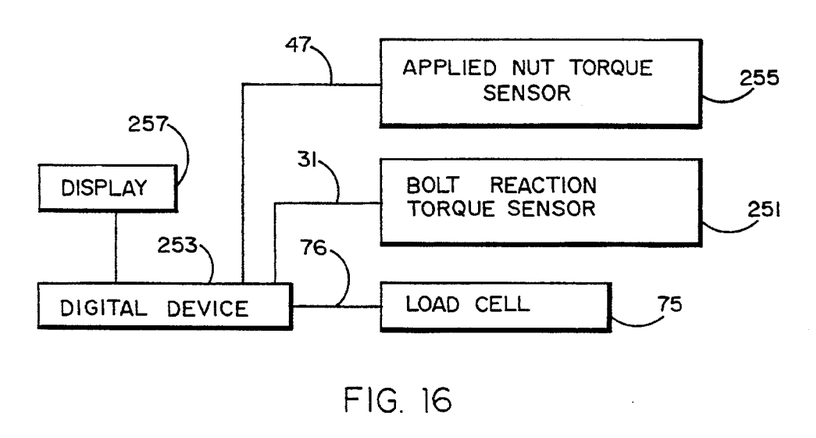
FIG. 16 is a block diagram illustrating the interconnection of the sensors of the torque measuring device to a digital device having an output display.

Referring to FIG. 16, a block diagram is provided to illustrate the electrical interconnection and operation of the torque measuring device which forms this invention. First lead set 31 connects a bolt reaction torque sensor 251 to a digital (e.g. computer and/or microprocessor) device 253. Second lead set 47 connects an applied nut torque sensor 255 to the digital device 253. The load cell 75 is connected to digital device 253 via third lead set 76. The digital device 253 is connected to an output, such as a display 257, which may be a video display or a printed display of the signals received by digital device 253 from the sensors 251 and 255 and load cell 75, as well as derivative signals which may be computed from such signals.

It is understood that the digital device 253 can be multiple digital devices, but that compactness can result from connecting all three sensors 75, 251, and 255 into a single digital device, as shown. First, the signals may be sampled simultaneously and treated as a composite group to yield an integrated force profile. In this manner, the composite profile can be displayed graphically to more readily give the operator an indication as to the performance of the nut 101 and bolt 99. This will also allow the direct comparison of force and torque measurements and will permit the computation of other parameters for comparison graphically or in tabular form.

One set of parameters that might be developed by the torque measuring device 11 include, for example, a torque of 34 inch pounds, which creates a counter torque in the hex key 61 of about 10 inch pounds. These measurements may result in 1320 pounds of compressive force. Returning momentarily to FIGS. 9–12, such parameters cause the cammed regions on the segments 145 and 147 of nut 101. These regions, which were slightly oval shaped before installation, will be wiped to a truncated oval shape during the preload phase of installation of the nut 101. As previously described, the continued rotation of the tool socket adapter 55 brings a pair of driving flats 125B of the insert 123 (best shown in FIG. 6) into contact with residual material in the cammed regions of nut segment 147. Such residual material in compressed radially into flutes interrupting the last few threads on the bolt 99 to lock bolt 99 and nut 101 together so as to create a substantial resistance to loosening as might otherwise occur as a consequence of vibrations and other physical forces that are likely to be encountered during normal use of the of the nut and bolt combination.

While the present invention has been described in terms of a torque testing and measurement device, one skilled in the art will realize that the structure and operation of the present invention can be applied to other applications. More particularly, the present invention may be applied to any situation where different types and magnitudes of forces are to be measured and simultaneously compared.

Although the invention has been described with reference to particular illustrative embodiments thereof, other changes and modifications of the invention may be made without departing from the spirit and scope of the invention. For example, the torque measuring device 11 may be universally applied to test a variety of locking bolt and nut combinations, including the hexagon, delta and oval shapes, without having to exert unusual effort in interchanging socket wrench adapters. A further universal aspect of this invention can be realized by shortening the internal hex key carrier 107 and its components so that the assembly, working with an adaptor, is transferable to hand tools and pneumatic drivers in order to reduce tool inventory.

I claim:

1. A device for measuring mechanical forces when a torque is applied to a nut to connect said nut to a bolt, said device comprising:

a load cell for measuring a compressive force generated between the nut and the bolt when said nut and bolt are connected together;

means for measuring the torque applied to the nut when said nut and bolt are connected together;

means for measuring the torque generated by the bolt in response to the torque applied to the nut when said nut and bolt are connected together;

output means connected to each of said load cell, said means for measuring the torque applied to the nut, and said means for measuring the torque generated by the bolt to provide an indication of the respective compressive force and the torques measured thereby; and a test stand for supporting said load cell, said means for measuring the torque applied to the nut, and said means for measuring the torque generated by the bolt, said test stand having a base for supporting said load cell, at least two uprights supported at first ends thereof by said base, and a top beam connected to opposite ends of said two uprights for supporting said means for measuring the torque applied to the nut and said means for measuring the torque generated by the bolt.

2. The device recited in claim 1 further comprising spring means carried by each of said at least two uprights and coupled to said top beam by respective rods to urge said top beam towards said base.

3. The device recited in claim 1 further comprising:

an inner housing fixably attached to said top beam and enclosing said means for measuring the torque generated by the bolt; and an outer housing in surrounding engagement with said inner housing and rotatably supported thereby, said outer housing having means for engaging the nut.

4. The device recited in claim 3 further comprising an elongated key supported from said inner housing, wherein the torque generated by the bolt is transmitted through said key to said means for measuring the torque generated by the bolt.

5. The device recited in claim 4 wherein said means for engaging the nut includes a socket having a central bore extending therethrough, said socket surrounding at least some of said key.

6. The device recited in claim 5 wherein the nut has a plurality of peripheral swage surfaces disposed around the exterior of said nut, said nut also having an internal threaded surface; and the bolt has a flared head and an opposing tail having a recess formed therein to receive said key, said bolt also having an external threaded surface to be engaged to said internal threaded surface of said nut to form a threaded interface, said socket adapted to engage the plurality of swage surfaces of said nut.

7. The device recited in claim 6 wherein said load cell is located between said nut and the head of said bolt to receive the compressive force generated when the nut and the bolt are connected together.

8. The device recited in claim 3 wherein said outer housing is axially displaceable with respect to said inner housing.

9. The device recited in claim 3 wherein said outer housing includes a plurality of handles extending outwardly therefrom to receive a manually applied turning force for causing a rotation of said outer housing and the nut engaged thereby.

10. The device recited in claim 1 further comprising:

a lower test plate;

an upper test plate located above said lower test plate and having a plurality of threaded apertures; and a plurality of bolts located through said threaded apertures of said upper test plate and into contact with said lower test plate to space said upper test plate from said lower test plate, said lower test plate and said upper test plate having respective slots to accommodate the nut and the bolt.

11. The device recited in claim 1 further comprising:

a lower compression plate having a sloped surface formed thereon; and an upper compression plate overlying said lower compression plate in horizontal alignment therewith and having a sloped surface formed thereon, the sloped surface of said upper compression plate seated upon the sloped surface of Said lower compression plate, and said upper and lower compression plates having respective slots to accommodate the nut and the bolt.

12. The device recited in claim 11 wherein said lower compression plate includes a vertical front wall having at least one aperture, and a slot located between said vertical front wall and the sloped surface of said lower compression plate, said upper compression plate having-at least one threaded bore, said device further comprising a bolt extending through said at least one aperture of said vertical front wall and into the threaded bore of said upper compression plate, whereby said at least one bolt draws said upper compression plate towards said vertical front wall over the sloped surface of said lower compression plate to release the nut and the bolt from the respective slots of said upper and lower compression plates.

13. The device recited in claim 1 wherein said output means includes means to display the compressive force measured by said load cell and the torques measured by said means for measuring the torque applied to the nut and said means for measuring the torque generated by the bolt.

* * * * *